United States Patent
Beck et al.

(10) Patent No.: US 6,199,959 B1
(45) Date of Patent: Mar. 13, 2001

(54) SECURING DEVICE FOR HYDRAULIC ASSEMBLY

(75) Inventors: Erhard Beck, Weilburg; Albrecht Otto, Schoneck, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/091,391
(22) PCT Filed: Dec. 16, 1996
(86) PCT No.: PCT/EP96/05651
    § 371 Date: Apr. 9, 1999
    § 102(e) Date: Apr. 9, 1999
(87) PCT Pub. No.: WO97/22503
    PCT Pub. Date: Jun. 26, 1997

(30) Foreign Application Priority Data

Dec. 20, 1995 (DE) .............................................. 195 47 541

(51) Int. Cl.[7] .................................................. B60T 13/14
(52) U.S. Cl. .................................. 303/DIG. 11; 303/115.4
(58) Field of Search ..................... 303/119.2, DIG. 11, 303/113.1, 113.2, 119.1, 119.3, DIG. 10, 115.4

(56) References Cited

U.S. PATENT DOCUMENTS

| 5,072,996 | * | 12/1991 | Heibel et al. | 303/114 |
| 5,403,077 | * | 4/1995 | Burgdorf et al. | 303/DIG. 11 |

FOREIGN PATENT DOCUMENTS

| 4008255 | 3/1990 | (DE) . |
| 4107625 | 9/1992 | (DE) . |
| 4324099 | 7/1993 | (DE) . |
| 92 030 33 U | 8/1993 | (DE) . |
| 356817 | 3/1990 | (EP) . |
| 53-66864 | * 12/1979 | (JP) . |
| 07215191 | * 8/1995 | (JP) . |
| WO 95/09752 | 4/1995 | (WO) . |

* cited by examiner

*Primary Examiner*—Robert J. Oberleitner
*Assistant Examiner*—Pamela J. Rodriguez
(74) *Attorney, Agent, or Firm*—Rader, Fishman & Grauer PLLC

(57) ABSTRACT

The present invention relates to a hydraulic assembly, which includes a housing and at least one cover closing the housing, wherein a retaining device is mounted on the cover for attachment of the hydraulic assembly to a stationary component.

3 Claims, 1 Drawing Sheet

SECURING DEVICE FOR HYDRAULIC ASSEMBLY

TECHNICAL FIELD

The present invention relates to Vehicle Brake Systems and more particularly relates to Hydraulic Accumulators used in hydraulic brake systems.

BACKGROUND OF THE INVENTION

German patent application No. 41 07 625 discloses a hydraulic accumulator assembly which is used on automotive vehicle brake systems with slip control. The hydraulic accumulator assembly includes a great number of functional elements in a carrier housing closed by covers. To attach the hydraulic accumulator assembly to a stationary component part, which is provided by metal sheets in the engine compartment of an automotive vehicle in the above-described case of application, a multi-point retaining device is provided on the carrier housing of the hydraulic assembly. The retaining device mainly includes a retaining pin to which a sheet-metal bowl is riveted or welded for the accommodation of a rubber element. The rubber element, in turn, is positioned on a pin screwed into the carrier housing. The structure of a retaining device of this type is sophisticated in terms of manufacture because it requires many individual parts and the provision of additional retaining bores in the carrier housing. Due to the required material strength of the carrier housing, the bores must be strategically positioned.

The hydraulic assembly disclosed in WO-A-95/09752 includes a mounting bracket on a stationary support for attachment of the hydraulic assembly having a valve housing and a motor housing. The mounting bracket is fitted both to a plug in the valve housing, which pressure-tightly closes a pump bore, and to an extension of the motor housing.

An object of the present invention is to provide a retaining device for a hydraulic assembly of the indicated type which eliminates the above-mentioned drawbacks.

DETAILED DESCRIPTION OF THE PREFERRED EMBODIMENTS

Figure 1:
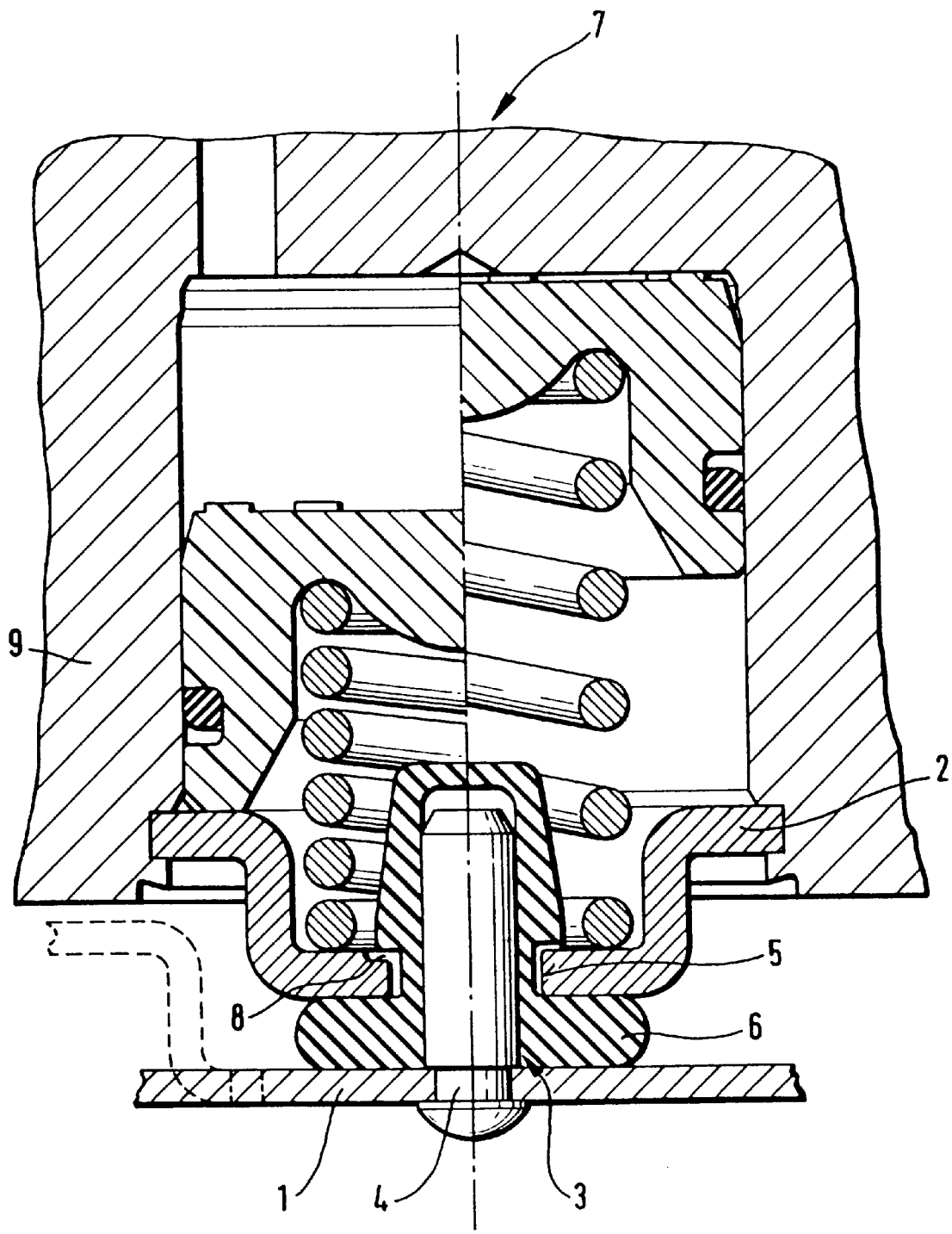
FIG. 1 is a cross sectional view of the hydraulic accumulator assembly of the present invention shown in a loaded mode and a non-loaded mode.

FIG. 1 shows a housing 9 and a cover 2 closing the housing 9. The present invention relates to an accumulator assembly 7 which is an essential component of a hydraulic assembly configured as a pressure control device for a slip-controlled brake system. The components which are substantial for the operation of the present invention (which are shown on a greatly enlarged scale) exhibit on cover 2 the retaining device 3 of the present invention which is adapted for attachment of the hydraulic assembly to a stationary component 1. The retaining device 3 takes the shape of a cylindrical element 4 which is in engagement with a retaining bore 5 of the cover 2. Further, the retaining device 3 has an elastomer 6 which is interposed between the cylindrical element 4 and the retaining bore 5. Interposed between the elastomer 6 and the retaining bore 5 is, at least in sections, a passage 8 which, in case of need, ensures that possibly occurring leakage fluid can be discharged from the interior of the accumulator assembly 7 outwards. The present invention shows two constructively different design variations for configuring the passage 8. Either the passage 8 is injection-molded in the shape of a drainage recess in the elastomer 6, or the passage 8 can be made by a drainage recess in the cover 2.

The elastomer 6 is preferably made of a conventional vulcanized part which has a basically bowl-shaped configuration and snaps with its annular groove into the retaining bore 5 of the cover 2. An axial distance is maintained between the cover 2 and the component 1 due to a collar-shaped extension of the elastomer 6, with the result that vibration or noise insulation is ensured at the point of attachment of the hydraulic assembly. The cylindrical element 4 engaging into the elastomer 6 is preferably welded or riveted to the component 1 that is shown as automotive body sheet. As an alternative, the cylindrical element 4 can be welded to the cover 2 and the elastomer 6 can be buttoned into a bore of the component 1. However, the disadvantage would be the omission of the favorable integration of the passage 8 in the cover 2.

In the illustration of the FIG. 1 embodiment, the accumulator assembly 7 has a great number of constructive details, showing, among others, a spring-loaded piston which is axially movable between the cover 2 and a pressure fluid bore. However, the details of the accumulator assembly 7 are of minor importance for the essence of the present invention because a major advantage is achieved by the compact and low-cost retaining device 3 on a cover 2. Consequently, the attachment according to the present invention can equally be used for a great number of housing closing arrangements by way of a cover and is not restricted to a functional unit. In hydraulic assemblies configured as pressure control devices for slip-controlled brake systems, not only the accumulator assemblies but also the damping chambers and the pump cylinders are closed by a cover so that the cavities thereof are also adapted for the accommodation of the retaining device 3 on the covers as disclosed in the present invention.

What is claimed:

1. A hydraulic accumulator of the type used in a slip controlled brake system, comprising:
    a housing;
        at least one cover closing the housing, said at least one cover having a retaining bore;
        a retaining device attached to said cover for attachment of the hydraulic accumulator to a stationery component, the retaining device including a protruding element that protrudes inside the cover and an elastomer interposed between the retaining bore and the protruding element.

2. The hydraulic accumulator as claimed in claim 1, wherein a passage is provided for the egress of fluid between the elastomer and the retaining device.

3. The hydraulic accumulator as claimed in claim 1, wherein the protruding element is cylindrical.

* * * * *